(12) United States Patent
Cheng et al.

(10) Patent No.: US 12,145,713 B2
(45) Date of Patent: Nov. 19, 2024

(54) ELECTRONIC DEVICE

(71) Applicant: VIVO MOBILE COMMUNICATION CO., LTD., Dongguan (CN)

(72) Inventors: Dongcun Cheng, Dongguan (CN); Wei Wang, Dongguan (CN); Lijun Zhu, Dongguan (CN); Zhengjun Luo, Dongguan (CN); Xiaonan Zhang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 165 days.

(21) Appl. No.: 17/849,585

(22) Filed: Jun. 24, 2022

(65) Prior Publication Data

US 2022/0324568 A1 Oct. 13, 2022

Related U.S. Application Data

(63) Continuation of application No. PCT/CN2020/139211, filed on Dec. 25, 2020.

(30) Foreign Application Priority Data

Dec. 27, 2019 (CN) .......................... 201911376440.6

(51) Int. Cl.
*B64C 13/28* (2006.01)
*B64U 20/40* (2023.01)
(Continued)

(52) U.S. Cl.
CPC .............. *B64C 13/28* (2013.01); *B64U 20/40* (2023.01); *B64U 80/25* (2023.01); *B64U 80/60* (2023.01);
(Continued)

(58) Field of Classification Search
CPC ...... B64C 39/024; B64C 13/28; H04N 23/54; H04N 23/57; H04N 23/90; H04M 1/0264; B64U 30/20; B64U 50/19; B64U 2101/30
See application file for complete search history.

(56) References Cited

U.S. PATENT DOCUMENTS

| 11,054,224 B1 * | 7/2021 | Stephens ................. F41H 11/02 |
| 2006/0038059 A1 * | 2/2006 | Perlo ...................... B64U 10/80 |
| | | 244/17.23 |

(Continued)

FOREIGN PATENT DOCUMENTS

| CN | 204669493 U | 9/2015 |
| CN | 106303182 A | 1/2017 |

(Continued)

OTHER PUBLICATIONS

Extended European Search Report issued in related European Application No. 20906442.7, mailed Jul. 7, 2023, 7 pages.

(Continued)

*Primary Examiner* — Thai Q Tran
*Assistant Examiner* — Jose M Mesa
(74) *Attorney, Agent, or Firm* — IPX PLLC

(57) ABSTRACT

An electronic device is provided, including a device shell and a flight photographing device. The device shell is provided with an opening and an inner cavity. The opening communicates with the inner cavity. The flight photographing device is movably arranged on the device shell. The flight photographing device is capable of extending out of the device shell through the opening or retracting into the device shell. In a case that the flight photographing device is located outside the device shell, the flight photographing device is separable from the device shell.

9 Claims, 3 Drawing Sheets

(51) Int. Cl.
  *B64U 30/20* (2023.01)
  *B64U 50/19* (2023.01)
  *B64U 80/25* (2023.01)
  *B64U 80/60* (2023.01)
  *H04M 1/02* (2006.01)
  *H04N 23/54* (2023.01)
  *H04N 23/57* (2023.01)
  *H04N 23/90* (2023.01)
  *B64U 101/30* (2023.01)

(52) U.S. Cl.
  CPC .......... *H04M 1/0264* (2013.01); *H04N 23/54* (2023.01); *H04N 23/57* (2023.01); *H04N 23/90* (2023.01); *B64U 30/20* (2023.01); *B64U 2101/30* (2023.01)

(56) References Cited

U.S. PATENT DOCUMENTS

| | | | |
|---|---|---|---|
| 2009/0187299 A1 | 7/2009 | Fregene et al. | |
| 2014/0336848 A1 | 11/2014 | Saund et al. | |
| 2016/0200438 A1* | 7/2016 | Bokeno | B64C 39/024 244/2 |
| 2016/0286128 A1* | 9/2016 | Zhou | H04L 65/762 |
| 2018/0309922 A1 | 10/2018 | Wang | |
| 2019/0047697 A1* | 2/2019 | Kulkarni | B64D 47/08 |
| 2020/0108947 A1* | 4/2020 | Yu | B64U 20/87 |
| 2021/0021760 A1* | 1/2021 | Liu | B64C 27/006 |

FOREIGN PATENT DOCUMENTS

| | | |
|---|---|---|
| CN | 106809387 A | 6/2017 |
| CN | 206278272 U | 6/2017 |
| CN | 107087042 A | 8/2017 |
| CN | 107485501 A | 12/2017 |
| CN | 208675340 A | 3/2019 |
| CN | 109873940 A | 6/2019 |
| CN | 110262561 A | 9/2019 |
| CN | 209731326 A | 12/2019 |
| IT | UB20159166 A1 | 6/2017 |
| IT | UA20162782 A1 | 10/2017 |

OTHER PUBLICATIONS

International Search Report issued in corresponding International Application No. PCT/CN2020/139211, mailed Mar. 24, 2021, 4 pages.

First Office Action issued in related Chinese Application No. 201911376440.6, mailed Nov. 25, 2021, 8 pages.

Second Office Action issued in related Chinese Application No. 201911376440.6, mailed May 18, 2022, 5 pages.

* cited by examiner

ELECTRONIC DEVICE

CROSS-REFERENCE TO RELATED APPLICATIONS

This application is a continuation of International Application No. PCT/CN2020/139211, filed on Dec. 25, 2020, which claims priority to Chinese Patent Application No. 201911376440.6 filed in China on Dec. 27, 2019. The entire contents of each of the above-referenced applications are expressly incorporated herein by reference.

TECHNICAL FIELD

The present disclosure relates to the technical field of communication devices, and in particular, to an electronic device.

BACKGROUND

As user demands increase, performance of electronic devices is continuously optimized, wherein the more prominent performance is that the screen-to-body ratio of the electronic device is increasing. In order to further increase the screen-to-body ratio of the electronic device, an existing electronic device usually adopts a liftable camera module. When the camera module needs to work, the camera module extends out of a device shell of the electronic device; and after the work of the camera module is completed, the camera module retracts into the device shell of the electronic device so as to be hidden in the device shell. The camera module with this structure can avoid the influence on the area of the display screen, so that the screen-to-body ratio of the electronic device can be increased.

However, the existing camera module only can photograph images when extending out of the device shell, photographing only can be performed within the limited working distance of the camera module, and longer-distance photographing cannot be realized. At the same time, the existing camera module requires a user to grasp the electronic device in the photographing process, and can adjust the photographing angle by adjusting body posture, so there is a problem of poor photographing flexibility.

SUMMARY

The present disclosure discloses an electronic device.

The present disclosure adopts the following technical solutions:

An electronic device includes a device shell and a flight photographing device, wherein the device shell is provided with an opening and an inner cavity; the opening communicates with the inner cavity; the flight photographing device is movably arranged on the device shell; the flight photographing device is capable of extending out of the device shell through the opening or retracting into the device shell; and in a case that the flight photographing device is located outside the device shell, the flight photographing device is separable from the device shell.

BRIEF DESCRIPTION OF DRAWINGS

The accompanying drawings described herein are used to provide further understanding of the present disclosure and constitute a part of the present disclosure. The illustrative embodiments of the present disclosure and descriptions thereof are used to explain the present disclosure, and do not constitute any improper limitation on the present disclosure. In the accompanying drawings.

DESCRIPTION OF REFERENCE NUMERALS

100—device shell, 210—mounting bracket, 220—flight photographing device, 221—cabinet, 2211—cabinet main body, 2211*a*—mounting hole, 2212—cover body, 221*a*—first photographing window, 221*b*—second photographing window, 222—first camera, 223—battery, 224—propeller, 225—second camera, 226—device bracket, 227—infrared proximity sensor, 228—sealing cover, 300—first driving mechanism.

DETAILED DESCRIPTION

To make the objectives, technical solutions and advantages of the present disclosure clearer, the following describes the technical solutions of the present disclosure with reference to the specific embodiments of the present disclosure and the corresponding accompanying drawings. Apparently, the described embodiments are merely a part rather than all of the embodiments of the present disclosure. All other embodiments obtained by a person of ordinary skill in the art based on the embodiments of the present disclosure shall fall within the protection scope of the present disclosure.

The technical solutions disclosed by various embodiments of the present disclosure are described in detail below with reference to the accompanying drawings.

Figure 1:
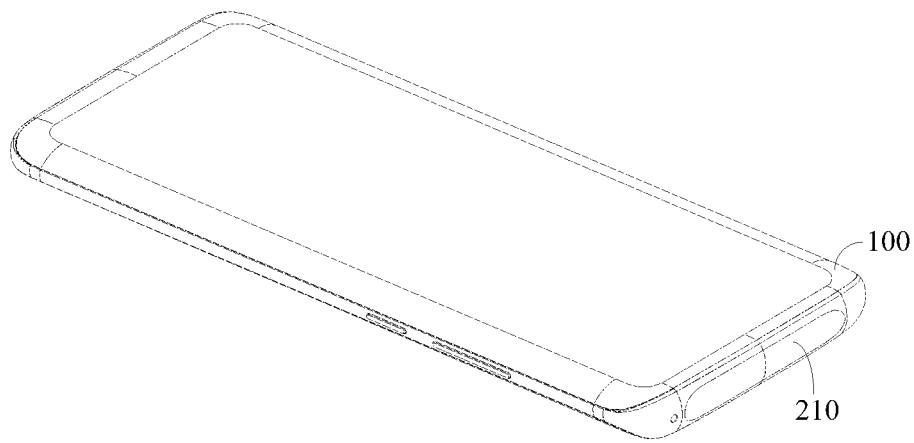
FIG. 1 is a structural schematic diagram of an electronic device according to an embodiment of the present.
Figure 2:
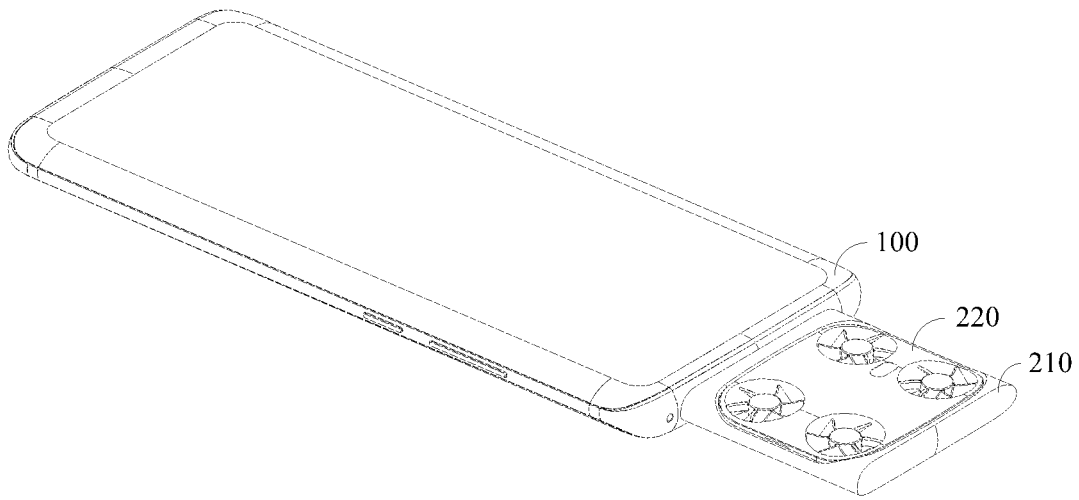
FIG. 2 is a schematic diagram of the flight photographing device in the extended state in FIG. 1.
Figure 3:
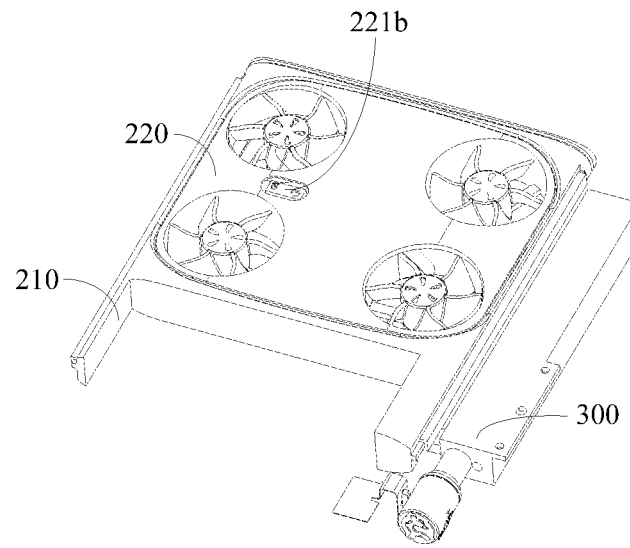
FIG. 3 is a schematic diagram of a partial structure of an electronic device according to an embodiment of the present disclosure.
Figure 4:
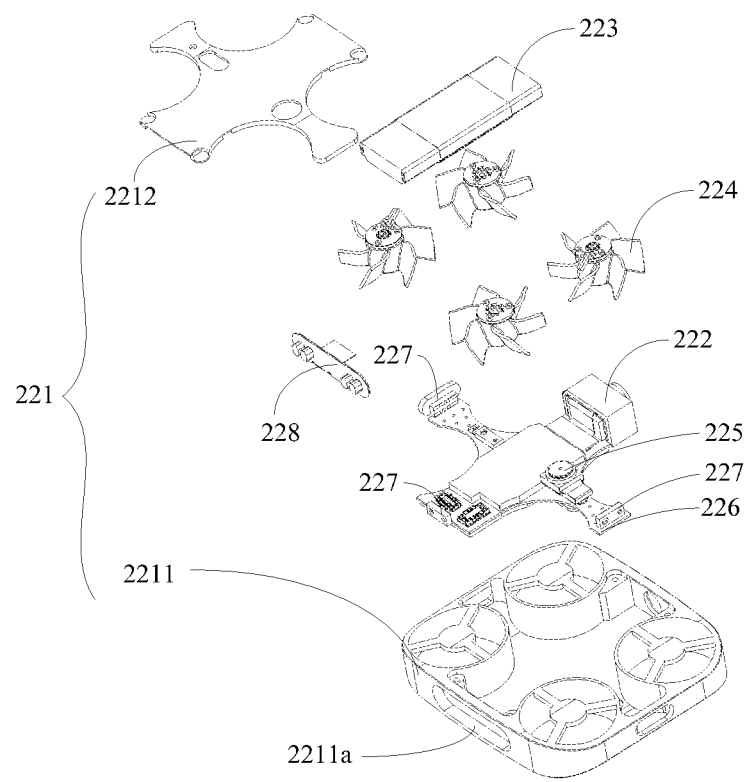
FIG. 4 is a schematic diagram of an exploded structure of a flight photographing device.
Figure 5:
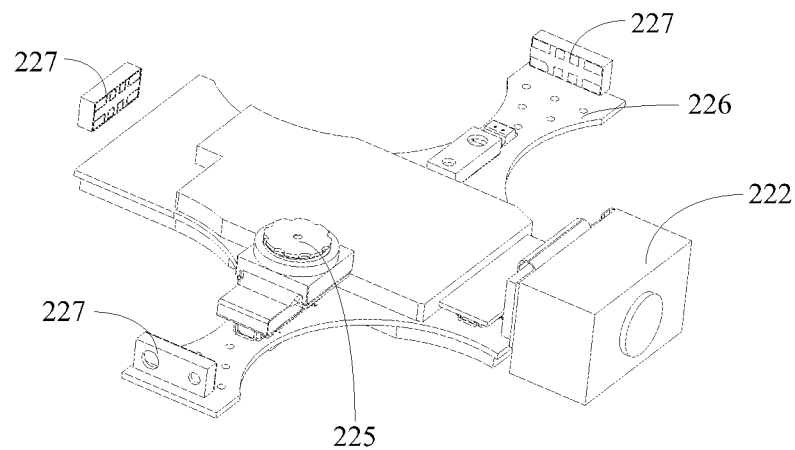
FIG. 5 is a schematic enlarged view of a partial structure of FIG. 4.
Figure 6:
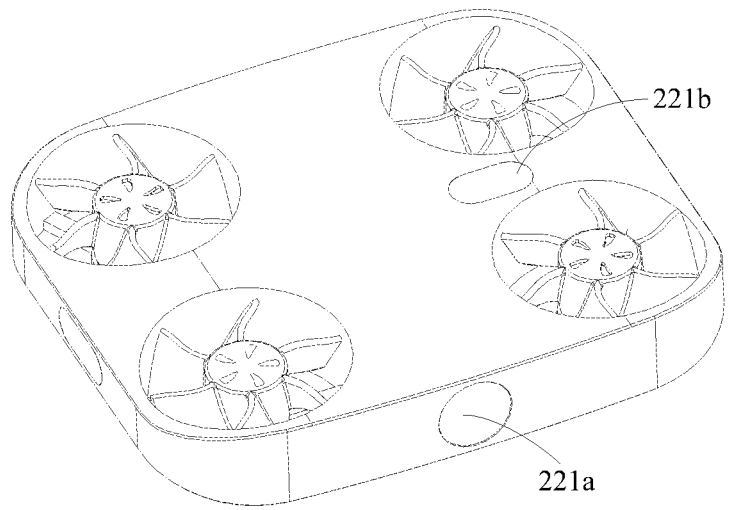
FIG. 6 is a structural schematic diagram of a flight photographing device according to an embodiment of the present disclosure from another perspective.

Referring to FIG. 1 to FIG. 6, the embodiments of the present disclosure disclose an electronic device. The electronic device includes a device shell 100 and a flight photographing device 220.

The device shell 100 is a basic component of the electronic device, and the device shell 100 can provide a mounting position for other components of the electronic device. In the embodiments of the present disclosure, the device shell 100 is provided with an opening and an inner cavity, and the opening communicates with the inner cavity. The opening may allow the flight photographing device 220 to enter and exit the device shell 100 so as to change the position of the flight photographing device 220.

In the embodiments of the present disclosure, the flight photographing device 220 is movably arranged on the device shell 100, and the flight photographing device 220 may extend out of the device shell 100 through the opening or retract into the device shell 100. In a case that the flight photographing device 220 retracts into the device shell 100 through the opening, the flight photographing device 220 can be hidden and mounted in the device shell 100.

The flight photographing device 220 is detachably connected to the device shell 100. In a case that the flight photographing device 220 extends out of the device shell 100 through the opening, the flight photographing device 220 is separable from the device shell 100, so that the flight photographing device 220 can be separated from the device shell 100 to fly. In the flight process, the flight photographing device 220 can adjust its own position in the air so as to realize photographing in various directions and finally realize more flexible photographing.

According to the electronic device disclosed by the embodiments of the present disclosure, the structure of the electronic device in the prior art is improved, so that the electronic device is provided with the flight photographing device 220, the flight photographing device 220 is detachably connected to the device shell 100, the flight photographing device 220 can retract into the device shell 100 through the opening, and the flight photographing device is hidden in the device shell 100. When it is necessary to photograph, the flight photographing device 220 extends out of the device shell 100 and is separated from the device shell 100, so that the flight photographing device 220 performs flight photographing, the flight photographing device 220 can adjust its own position under the flight state, and flexible photographing can be realized. It can be seen that the electronic device disclosed by the embodiments of the present disclosure can improve the photographing flexibility of the electronic device.

In the embodiments of the present disclosure, in a case that the flight photographing device 220 is located in the device shell 100, the flight photographing device 220 and the device shell 100 are in a detachable assembling state. Specifically, the flight photographing device 220 and the device shell 100 may be assembled through magnetic attraction, buckling connection and other detachable modes. In a specific implementation manner, an electromagnetic piece may be arranged in the device shell 100. In a case that the flight photographing device 220 retracts into the device shell 100 through the opening, the electromagnetic piece may be powered on so as to generate a magnetic force to attract the flight photographing device 220, thereby realizing assembling. In a case that the electromagnetic piece is powered off, the magnetic attraction between the flight photographing device 220 and the device shell 100 is relieved.

In another specific implementation manner, the device shell 100 may be provided with a first buckle, and the flight photographing device 220 may be provided with a second buckle. In a case that the flight photographing device 220 retracts into the device shell 100 through the opening, the first buckle cooperates with the second buckle so as to realize detachable assembling between the flight photographing device 220 and the device shell 100. The flight photographing device 220 and the device shell 100 may be detachably assembled through other modes.

The movement of the flight photographing device 220 may be realized through manual control of a user. For example, the device shell 100 may be provided with a sliding button. The sliding button may cooperate with the flight photographing device 220. When the user controls the sliding button to slide, the sliding button can slide to toggle the flight photographing device 220 to extend out of the device shell 100 through the opening. In the process, the cooperation between the flight photographing device 220 and the device shell 100 may be relieved (for example, the first buckle and the second buckle are released), thereby preparing for the separation of the flight photographing device and the device shell 100 in a case that the flight photographing device 220 is located outside the device shell 100.

In order to facilitate the assembling of the flight photographing device 220, in an exemplary solution, the electronic device disclosed by the embodiments of the present disclosure may further include a mounting bracket 210, the flight photographing device 220 is arranged on the mounting bracket 210, and the flight photographing device 220 may extend out of the device shell 100 through the opening along with the mounting bracket 210 or retract into the device shell 100. In a case that the flight photographing device 220 retracts into the device shell 100 along with the mounting bracket 210, the flight photographing device 220 is detachably connected to the device shell 100 through the mounting bracket 210. In a case that the flight photographing device 220 extends out of the device shell 100 along with the mounting bracket 210, the flight photographing device 220 is separable from the mounting bracket 210 so as to be separated from the device shell 100. The configuration of the mounting bracket 210 facilitates the assembling between the flight photographing device 220 and the device shell 100.

In an exemplary solution, the mounting bracket 210 may be provided with a mounting space, the flight photographing device 220 may be placed in the mounting space, and in a case that the flight photographing device 220 extends out of the device shell 100, the flight photographing device 220 directly flies away. Specifically, the mounting space may be a mounting groove.

For the convenience to control the movement of the flight photographing device 220, in an exemplary solution, the electronic device disclosed by the embodiments of the present disclosure may further include a first driving mechanism 300, and the first driving mechanism 300 is arranged in the device shell 100. The first driving mechanism 300 is connected to the flight photographing device 220, and the first driving mechanism 300 drives the flight photographing device 220 to extend out of the device shell 100 through the opening or retract into the device shell 100. The first driving mechanism 300 is detachably connected to the flight photographing device 220, thereby indirectly realizing detachable connection with the device shell 100. In a case that the flight photographing device 220 extends out of the device shell 100, the flight photographing device can be separated from the first driving mechanism 300 so as to be separated from the device shell 100. The first driving mechanism 300 can facilitate and intelligentize the movement control of the flight photographing device 220, so that use of a user can be facilitated.

In the embodiments of the present disclosure, the first driving mechanism 300 may be a screw rod driving mechanism, a hydraulic telescopic piece, a pneumatic telescopic piece, a linear motor and other driving devices. The specific types of the first driving mechanism 300 are not limited in the embodiments of the present disclosure.

In a specific implementation manner, the first driving mechanism 300 and the flight photographing device 220 may be connected through magnetic attraction. Specifically, a part of the first driving mechanism 300 driving the flight photographing device 220 to move may include an electromagnetic piece, and the flight photographing device is provided with a magnet or a magnetic attraction piece attracted by magnetism. In a case that the electromagnetic piece is powered on, the first driving mechanism 300 is connected to the flight photographing device 220 through magnetic adsorption. In a case that the electromagnetic piece is powered off, connection between the first driving mechanism 300 and the flight photographing device 220 is released due to the demagnetization of the electromagnetic piece.

In a case that the electronic device includes a mounting bracket 210, the first driving mechanism 300 may be in driving connection with the mounting bracket 210, and the first driving mechanism 300 drives the mounting bracket 210 to drive the flight photographing device 220 to extend out of the device shell 100 through the opening or retract into the device shell 100. As described above, the flight photographing device 220 may be placed in the mounting space of the mounting bracket 210, so the first driving mechanism 300 drives the mounting bracket 210 to drive the flight photographing device 220 to enter and exit the device shell 100. In a case that the flight photographing device 220 is located outside the device shell 100, the flight photographing device 220 may directly fly away, and it is unnecessary to directly arrange a detachable structure between the flight photographing device 220 and the device shell 100, which can undoubtedly simplify the operation of a user and facilitate the use of the user.

In an exemplary solution, in a case that the electronic device disclosed by the embodiments of the present disclosure includes a mounting bracket 210, and the mounting bracket 210 may further be provided with at least one of a light supplement module, a receiver, a fingerprint recognition module and a USB interface. In this case, the influence on the arrangement area of the display screen of the electronic device by the above functional device can be avoided, so that the screen-to-body ratio of the electronic device can be further increased. During use, the above functional device may extend out of the device shell 100 through the opening along with the mounting bracket 210. After the work, the above functional device may retract into the device shell 100 through the opening along with the mounting bracket 210, so that the functional device can be hidden in the device shell 100.

In an exemplary solution, the mounting bracket 210 is in sliding connection with the device shell 100 through a sliding rail. An opening of the device shell 100 is provided with a limiting structure. When a main body of the mounting bracket 210 slides out of the opening of the device shell 100, the limiting structure of the opening limits the mounting bracket 210 from further sliding out, and the mounting bracket 210 is not separated from the device shell 100. At this time, the flight photographing device 220 is supported on the mounting bracket, and a user may manually take out the flight photographing device 220.

In the electronic device disclosed by the embodiments of the present disclosure, the flight photographing device 220 may have various structures. In an exemplary solution, the flight photographing device 220 includes a cabinet 221, and a first camera 222, a battery 223, a propeller 224 and a second driving mechanism which are arranged on the cabinet 221, wherein the second driving mechanism is in driving connection with the propeller 224 and drives the propeller 224 to rotate, and the battery 223 is connected to the first camera 222 and the second driving mechanism through power supply. In the specific work process, the propeller 224 is driven by the second driving mechanism to rotate so as to drive the whole flight photographing device 220 to fly. In the flight process, the flight photographing device 220 can adjust its own position, so that the first camera 222 can perform photographing flexibly.

In an exemplary solution, the cabinet 221 disclosed by the embodiments of the present disclosure may include a top wall, a bottom wall and a side wall for connecting the top wall and the bottom wall, the side wall is provided with a first photographing window 221a, the first camera 222 is arranged in the cabinet 221, and a lens of the first camera 222 and the first photographing window 221a are arranged oppositely. In this case, the first camera 222 can realize lateral photographing of the flight photographing device 220 through the first photographing window 221a on the side wall, which undoubtedly can meet the lateral photographing of the flight photographing device 220. The first camera 222 is arranged in the cabinet 221, so that the first camera can be protected by the cabinet 221 and damage caused by bump in the flight process can be avoided.

The flight photographing device 220 disclosed by the embodiments of the present disclosure may further include a second camera 225, the second camera 225 is arranged in the cabinet 221, the bottom wall is provided with a second photographing window 221b, and a lens of the second camera 225 and the second photographing window 221b are arranged oppositely. In this case, the second camera 225 of the flight photographing device 220 can perform overlooking photographing through the second photographing window 221b. At the same time, the second camera 225 is arranged in the cabinet 221, so that the second camera can be protected by the cabinet 221. In this case, the second camera 225 may be used to detect altitude data of an object through overlooking photographing.

The flight photographing device 220 disclosed by the embodiments of the present disclosure may further include a device bracket 226, the device bracket 226 is arranged in the cabinet 221, and the first camera 222, the second camera 225 and the battery 223 are all mounted on the device bracket 226. In this assembling mode, the first camera 222, the second camera 225 and the battery 223 may be mounted on the device bracket 226 in advance, then form a modular structure together with the device bracket 226, and are integrally mounted in the cabinet 221, which can undoubtedly improve the assembling efficiency.

As described above, the side wall of the cabinet 221 is provided with a first photographing window 221a. In a specific implementation manner, the number of the side walls may be four, the first photographing window 221a is arranged on one side wall, the other three side walls and the bottom wall may be provided with proximity sensors, and the proximity sensors can prevent the flight photographing device 220 from colliding with other objects in the flight process. Specifically, the proximity sensors may be infrared proximity sensors 227. This can undoubtedly improve the flight safety of the flight photographing device 220. The top wall may also be provided with a proximity sensor.

In order to realize flexible photographing, in an exemplary solution, the flight photographing device 220 disclosed by the embodiments of the present disclosure may include a third camera and a fourth camera, the third camera and the fourth camera may be arranged outside the cabinet 221 respectively, the third camera and the fourth camera may be distributed opposite to each other, the third camera and the fourth camera are hinged with a spherical surface of the cabinet 221, photographing in a larger field of view can be realized by adjusting the angles of the third camera and the fourth camera, and more photographing viewing angles can be realized.

In the embodiments of the present disclosure, the flight photographing device 220 may be one propeller 224, or may include a plurality of propellers 224. The plurality of propellers 224 are arranged at intervals, and the plurality of propellers 224 jointly act so as to enable the flight photographing device 220 to fly more stably. In a specific implementation manner, the number of the propellers 224 is four, the four propellers 224 are sequentially arranged at four corners of the cabinet 221, and the two diagonally distributed propellers 224 and the other two diagonally distributed propellers 224 may have opposite rotating directions, so that the driving balance is realized, and the flight photographing device 220 can maintain the position better.

Specifically, the number of the second driving mechanism may be one or more. In a case that the number of the second driving mechanism is one, the second driving mechanism may drive all propellers 224 to rotate through a transmission mechanism. In an exemplary solution, the number of the driving mechanisms is equal to the number of the propellers 224, and each second driving mechanism is in driving connection with one propeller 224. One second driving mechanism is singly configured for each propeller 224, so that the flight photographing device 220 does not require a complex power transmission mechanism. At the same time, when there are a plurality of second driving mechanisms, in a case that some of the second driving mechanisms are in failure and stop operation, due to the driving of the other second driving mechanisms, continuous flight of the flight photographing device 220 can be maintained.

Referring to FIG. 4 again, in an exemplary solution, the cabinet 221 may include a cabinet main body 2211 and a cover body 2212, the cover body 2212 is fixed on the opening of the cabinet main body 2211, the propeller 224 and the second driving mechanism are mounted on the cabinet main body 2211, the cover body 2212 is provided with an avoidance gap, and the avoidance gap is arranged along a partial edge of the propeller 224. In this case, the propeller 224 and the second driving mechanism are mounted on the cabinet main body 2211, so that assembling between the propeller and the second driving mechanism is convenient to realize on the same mounting basis. At the same time, it is convenient for a user to open the cover body 2212 in the maintenance process, so that it is convenient to maintain accessories in the cabinet 221. In a specific implementation manner, the cover body 2212 may be fixed on the cabinet body 2211 through clamping connection, threaded connection and other fixing modes.

Referring to FIG. 4 again, in a specific implementation manner, the side wall (that is, the side wall of the cabinet 221) of the cabinet main body 2211 may be provided with a mounting hole 2211a, the cabinet 221 may further include a sealing cover 228, the sealing cover 228 may be provided with a charging contact, and the charging contact is electrically connected to a battery 223, so that the flight photographing device 220 can be charged. The separate sealing cover 228 is undoubtedly more convenient to arrange a charging connection structure thereon. Specifically, the sealing cover 228 may be detachably connected to the mounting hole 2211a, so that it is convenient for a user to disassemble the sealing cover 228 to maintain the partial structure of the flight photographing device 220.

The electronic device disclosed by the embodiments of the present disclosure may be a smart phone, a tablet computer, an e-book reader, a wearable device (such as a smartwatch), a game machine and the like. The electronic device disclosed by the embodiments of the present disclosure may be other types, and the specific types of the electronic device are not limited in the embodiments of the present disclosure.

The embodiments of the present disclosure focus on describing differences between the embodiments, and different optimization features of the embodiments may be combined to form better embodiments provided that they are not contradictory. Considering brevity, details are not described herein again.

The above is only embodiments of the present disclosure, and is not intended to limit the present disclosure. Various changes and modifications may be made to the present disclosure by those skilled in the art. Any modifications, equivalent substitutions, improvements and the like made within the spirit and principle of the present disclosure should be included within the scope of the claims of the present disclosure.

The invention claimed is:

1. An electronic device, comprising:
   a device shell;
   a mounting bracket; and
   a flight photographing device, wherein:
   the device shell is provided with one opening and an inner cavity;
   the one opening communicates with the inner cavity;
   the mounting bracket is movably arranged on the device shell;
   the flight photographing device is arranged on the mounting bracket;
   the flight photographing device and the mounting bracket are configured to extend from both inside the inner cavity to both out of the inner cavity of the device shell by moving in a single direction through the one opening or retract from both out of the inner cavity to both inside the inner cavity of the device shell by moving reversely in the single direction through the one opening of the device shell; and
   when the flight photographing device and the mounting bracket extend out of the device shell, the flight photographing device is separable from the mounting bracket.

2. The electronic device according to claim 1, further comprising a first driving mechanism, wherein the first driving mechanism is in driving connection with the mounting bracket, and the first driving mechanism drives the mounting bracket to drive the flight photographing device to extend out of the device shell and retract into the device shell through the one opening.

3. The electronic device according to claim 1, wherein:
   the flight photographing device comprises a cabinet, a first camera, a battery, a propeller, and a second driving mechanism which are arranged in the cabinet;
   the second driving mechanism is in driving connection with the propeller and drives the propeller to rotate; and
   the battery is connected to the first camera and the second driving mechanism through power supply.

4. The electronic device according to claim 3, wherein:
   the cabinet comprises a top wall, a bottom wall, and a side wall for connecting the top wall and the bottom wall;
   the side wall is provided with a first photographing window;
   the first camera is arranged in the cabinet; and
   a lens of the first camera and the first photographing window are arranged oppositely.

5. The electronic device according to claim 4, wherein:
   the flight photographing device further comprises a second camera;
   the second camera is arranged in the cabinet;
   the bottom wall is provided with a second photographing window; and
   a lens of the second camera and the second photographing window are arranged oppositely.

6. The electronic device according to claim 5, wherein:
   the flight photographing device further comprises a device bracket;
   the device bracket is arranged in the cabinet; and the first camera, the second camera, and the battery are mounted on the device bracket.

7. The electronic device according to claim 4, wherein:
the number of the side walls is four;
the first photographing window is arranged on one side wall; and
infrared proximity sensors are arranged on the other three side walls and the bottom wall.

8. The electronic device according to claim 3, wherein:
the flight photographing device comprises four propellers comprising a first propeller, a second propeller, a third propeller, and a fourth propeller;
the first, second, third, and fourth propellers are arranged at four corners of the cabinet sequentially;
the first and third propellers which are diagonally distributed and the second and fourth propellers which are also diagonally distributed have opposite rotating directions;
the number of the second driving mechanism is equal to the number of the propellers; and
each second driving mechanism is in driving connection with one propeller.

9. The electronic device according to claim 3, wherein:
the cabinet comprises a cabinet main body and a cover body;
the cover body is fixed on an opening of the cabinet main body;
the propeller and the second driving mechanism are mounted on the cabinet main body;
the cover body is provided with an avoidance gap; and
the avoidance gap is arranged along a partial edge of the propeller.

* * * * *